Patented Sept. 16, 1924.

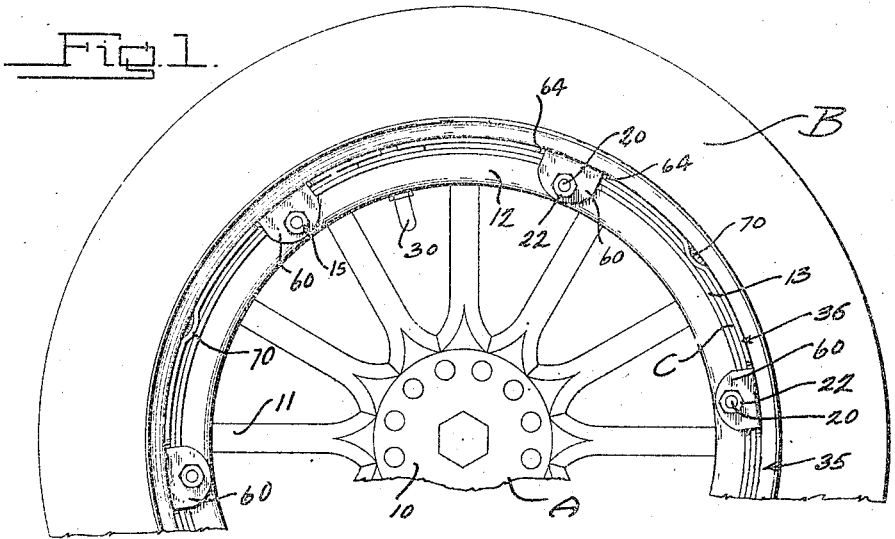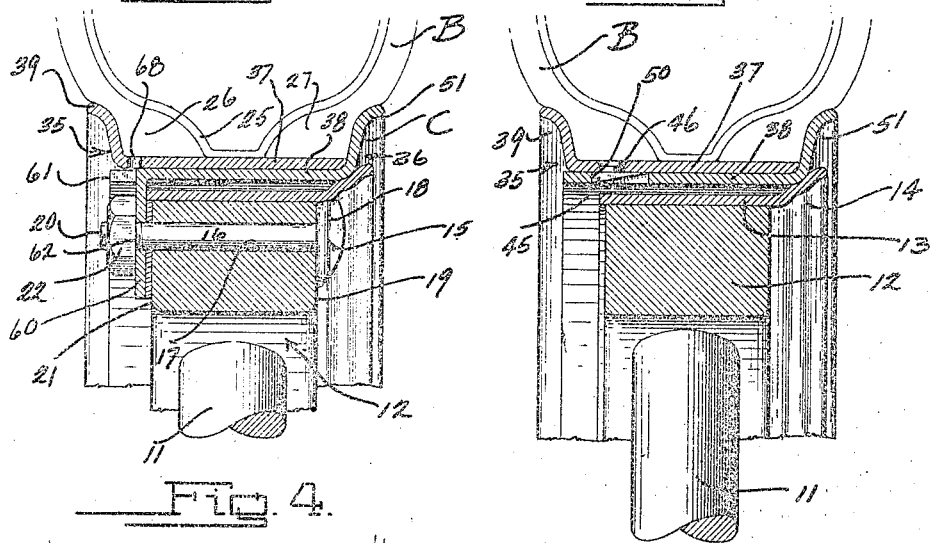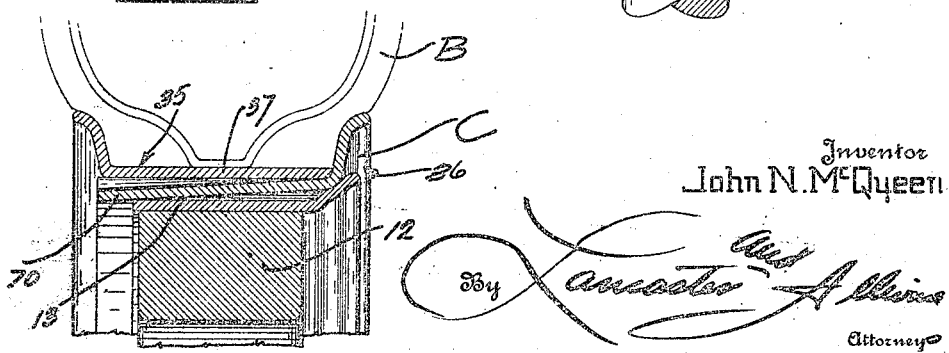

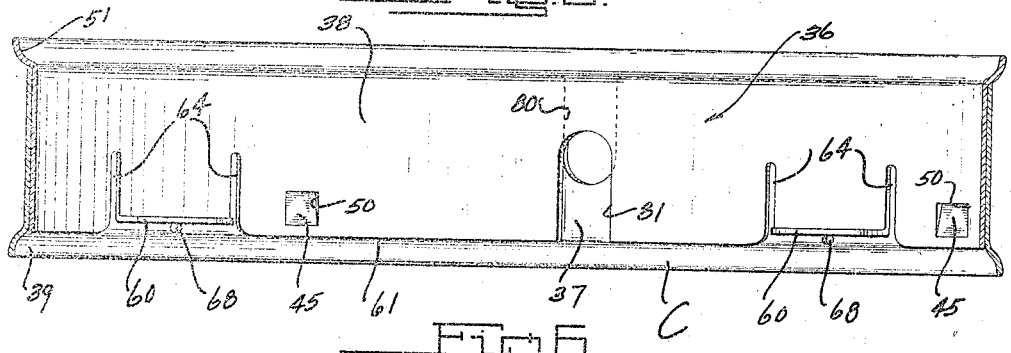
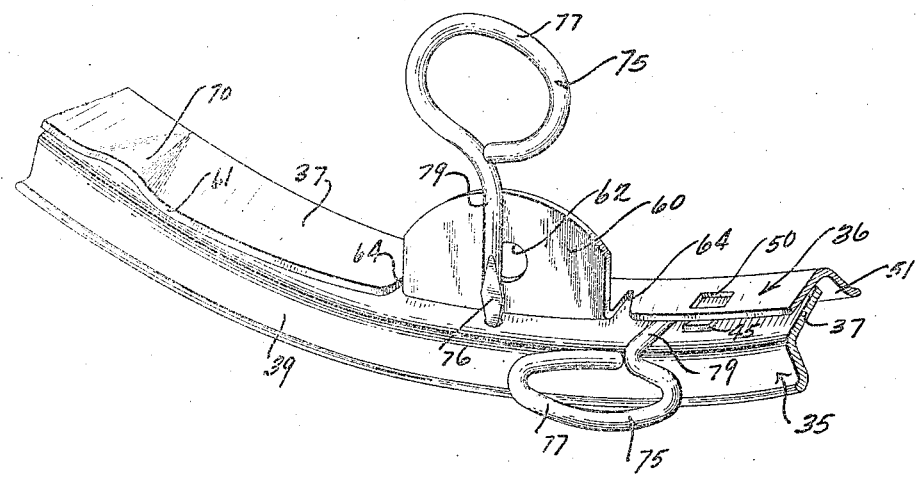
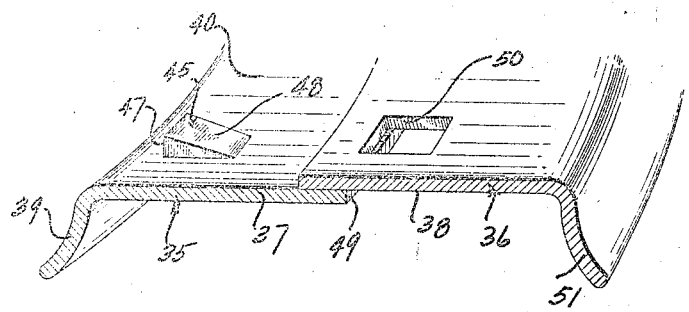

1,508,853

UNITED STATES PATENT OFFICE.

JOHN N. McQUEEN, OF PRESTON, IDAHO.

DEMOUNTABLE RIM.

Application filed November 10, 1922. Serial No. 600,131.

*To all whom it may concern:*

Be it known that I, JOHN N. MCQUEEN, a citizen of the United States, residing at Preston, in the county of Franklin and State of Idaho, have invented certain new and useful Improvements in Demountable Rims, of which the following is a specification.

This invention relates to improvements in demountable rims for use in connection with vehicle wheels.

The primary object of this invention is the provision of a practical type of demountable rim, which is relatively easy to assemble in connection with the mounting of a tire upon a vehicle wheel, so that the tire may be best protected against injury to parts thereof.

A further and important object of this invention is the provision of a demountable rim which embodies practical advantages over the type of demountable rim described and claimed in my copending application, Serial No. 523,477, filed Dec. 19, 1921.

A further object of this invention is the provision of a demountable rim which embodies a pair of telescopic sections, and includes a novel means for locking the sections together, said means being easily arranged, without the necessity of undue manual exertion, to permit detachment of the sections.

Other objects and advantages of this invention will be apparent during the course of the following detailed description.

In the accompanying drawings, forming a part of this specification, and wherein similar reference characters designate corresponding parts throughout the several views.

Figure 1 is a fragmentary side elevation of a vehicle wheel embodying the improved demountable rim construction.

Figures 2, 3 and 4 are fragmentary transverse cross sectional views, showing cooperating details of this invention.

Figure 5 is a fragmentary inside view of the sections of the improved demountable rim, showing them in their cooperative positions.

Figure 6 is a fragmentary perspective view, showing the manner in which the sections of the demountable rim are relatively detached.

Figure 7 is a perspective view, showing the interlocking means for the sections of the demountable rim.

In the drawings, wherein for the purpose of illustration is shown but the preferred embodiment of this invention, the letter A designates a vehicle wheel upon which the tire B is adapted to be positioned, as by means of the improved demountable rim construction C.

Referring to the vehicle wheel A, the same may be of any preferred type, disc, or spoke. For purposes of illustration, the vehicle wheel A includes a hub 10, spokes 11, and felly 12. The felly band 13 may be outwardly positioned upon the circumference of the felly 12 in any of the well known methods, as by shrinking, clamping, and the like; this felly band 13, ordinarily including the laterally and outwardly extending demountable rim engaging flange 14. The bolts 15 are carried by the felly 12, having their shank portions 16 preferably disposed through the transverse apertures 17 in the felly 12, the heads 18 of said bolts preferably overlying the inside surface 19 of the felly 12, whereas the screw threaded ends 20 of the shanks 16 extend outwardly of the outside surface 21 of said felly 12, and adjustably receive nuts 22 thereon, for use in connection with the clamping of the demountable rim construction C, as will be subsequently described.

The tire B may be of any approved character, such as solid, pneumatic, or other resilient type. In the most instances, the tire B will be of the pneumatic type, including the inner tube 25, which is ordinarily exposed intermediate the beads 26 and 27 of the tire B, and rests upon the rim construction C. The pneumatic tire B also includes the valve 30, which extends radially through the demountable rim construction C, and through a suitable aperture (not shown) of the felly 12.

Referring to the improved rim construction C, the same includes the telescopic outer and inner rim sections 35 and 36 respectively, which respectively include the annular seating flanges 37 and 38 adapted for cooperative sliding engagement; these portions 37 and 38 being substantially of the same width, and being disposed in overlapping relation for substantially their entire width. The outer rim section 35 is preferably provided upon its outer circumferential edge with the tire retaining flange 39, which may be of any formation, either the clincher type or outwardly flared type. The inner circumference 40 of the section 35 has the wedge shaped locking lugs 45 mounted thereon, in rigid manner, as by rivet shank portions 46. These locking lugs 45 are arranged in spaced relation about the inside circumference 40, presenting abrupt shoulders 47 facing in the direction of the tire retaining flange 39, and providing inclined sliding faces 48 slanting in the direction of the circumferential marginal edge 49. These wedge shaped locking lugs 45 are connected to the rim section 35 in such manner as to not weaken the same, and are preferably disposed nearer to the tire retaining flange 39 than the other marginal edge 49. The cooperating annular portion 38 of the inner rim section 36 is preferably provided with polygonal shaped openings 50, which extend radially therethrough and are adapted for receiving the locking lugs 45 when the sections 35 and 36 are in interlocked relation. A tire retaining flange 51 is also provided upon the inside circumferential margin of the rim section 36. When the sections 35 and 36 are disposed in interlocked relation, as by engagement of the clamps 45 in their apertures 50, the tire retaining flanges 39 and 51 are oppositely disposed to provide an annular groove for reception of the pneumatic tire B, in the well known manner. In order to provide a simple and economic means for the attachment of the rim construction C to the vehicle wheel A, it is preferred that the flanges 60 be provided upon the inner rim section 36, which extends radially inwardly of the opening defined by said section 36, adjacent the circumferential edge 61 thereof. These locking flanges 60 are preferably of integral and rigid formation with the material of which the inner rim section 36 is constructed, and each have a transverse aperture 62 therethrough, adapted for receiving the screw threaded shank 20 of a bolt 15.

As the apertures 50 are disposed adjacent the locking lugs 60, it is preferred that the slots 64 be struck inwardly from the outer circumferential edge 61 of the inner rim section 36, on either side of the locking lugs 60, and which construction is provided to permit some flexing of the inner rim section 36 adjacent the apertures 50, to permit detachment of the rim sections.

In operation, the demountable rim sections 35 and 36 may be telescopically slid so that the tire B is mounted upon the body portion 37 of the outer rim section 35, so that the inner tube 25 is disposed thereon against liability of being pinched. When the sections 35 and 36 are entirely assembled, the locking lugs 45 will, of course, be seated in the apertures 50, and the shoulders 47 engage marginal edges of said apertures 50 to prevent liability of accidental detachment of the rim sections, substantially as is illustrated in Figure 3 of the drawings. When in its assembled position, it is to be noted, that due to the fact that the locking flanges 60 are struck and bent so that the plane thereof lies inwardly of the plane of the outer marginal edge 61 of the inner section 36, apertures 68 radially disposed through the annular seating portion 37 of the outer section 35 adjacent the tire flange 39 will be exposed adjacent each of the locking flanges 60.

In assembling the demountable rim construction C and the pneumatic tire B upon the wheel felly 12, the assembled structure is axially slid over the vehicle wheel felly band 13, until the tire retaining flange 51 of the inner rim section 36 is seated upon the flange 14 of said felly band 13. In connection with the mounting of the demountable rim structure C, to prevent radial play of the same upon the vehicle rim A, it is preferred to crimp the annular portion 37 of the inner rim section 36, in V-shaped manner, as at 70; a plurality of these crimps 70 being provided about the section 36, which bulge inwardly in wedge manner, so that the inclined inner surfaces thereof ride over the outer marginal portion of the felly band 13, as the rim C is slid onto the felly wheel A, substantially as is illustrated in Figure 4, and whereby any liability of radial play of the rim upon the felly band 13 is obviated. When the demountable rim C has thus far been assembled upon the vehicle wheel A, it can readily be understood that the radially and inwardly extending locking flanges 60 will be disposed adjacent the outer side surface 21 of the felly 12, so that the screw threaded ends 20 of the bolts 15 are extended through the transverse openings 62. Upon application of the nuts 22, the flanges 60 will be securely and effectively locked to the felly 12, against any liability of axial or circumferential movement with respect to the wheel A.

In connection with the detachment of the outer and inner sections 35 and 36, it is to be noted that a special type of tool 75 has been provided, which includes a tapered pointed end 76 and a hand engaging loop portion 77. These tools 77, of which a plurality are provided, are to be cooperatively used in connection with the lateral disconnection movement of the rim sections 35 and 36. Thus, one of the tools 75 is so disposed that the pointed end 76 thereof engages through a radial opening 68 of the outer rim section 35. The second of the tools 75 is so disposed that the shank portion 79 thereof is slid intermediate the annular seating portions 37 and 38, adjacent a locking lug 45. Due to the transverse slot 64, the annular portion 37, upon prying or lever movement of the tool 75 disposed intermediate the sections 35 and 36, may be flexed laterally of the rim portion 38, to permit lifting of a locking lug 45 from its aperture 50. At the time, the tool 75 which has its pointed end disposed in the radial aperture 68, is utilized as a lever, whereby the shank portion 79 thereof engages against a locking flange 60, as a fulcrum, and by which means the sections 35 and 36 may be laterally slid for relative disengagement. This operation is, of course, continued for each locking flange 60, and the various locking lugs 45, until the sections 35 and 36 have been unlocked throughout their entire circumferences.

In order to accommodate the valve 30 of the tire B, the annular portions 37 and 38 of the outer and inner rim sections respectively, are provided with slots 80 and 81 respectively, which extend inwardly from the opposite circumferential edges thereof, so that when the sections 35 and 36 are in assembled relation, they will provide a circular opening for reception of the valve stem of the tire B, thus obviating the necessity for inserting the valve stem through a hole in the rim in the ordinary manner.

From the foregoing description of this invention, it can readily be understood, that an improved demountable rim has been provided, which is extremely practical and economical in the construction thereof, not alone in the provision of the simple locking flanges 60 which dispense with the ordinary detachable and movable ring clips, but also in the general facility with which the rim sections may be relatively assembled and detached.

Various changes in the shape, size and arrangement of parts may be made to the form of invention herein shown and described, without departing from the spirit of the invention or the scope of the claims.

I claim:

1. As an article of manufacture, a demountable tire rim section having apertures extending radially therethrough for receiving locking lugs of a second rim section and being slotted transversely inwardly from a circumferential edge of the same adjacent said apertures to permit radial flexing of the apertured portion of the rim section.

2. As an article of manufacture, a demountable rim section providing an annular wheel engaging portion having substantially V-shaped crimps extending radially inwardly of the inner periphery thereof, and a tire seating flange annularly extending about one edge of said wheel engaging portion.

3. As an article of manufacture, a wheel rim construction comprising a pair of sections each including annular body portions adapted for relative overlapping for disposition about a wheel, means for connecting said body portions of the sections, said sections at the outer annular edges thereof having tire seating flanges thereon, means carried by the body portion of the inner section for securing the same to a wheel, said inner section having substantially V-shaped crimps extending from the inner periphery thereof.

4. As an article of manufacture, a demountable rim comprising an outer section having wedge lugs extending inwardly of the inner circumference thereof, and an inner section having seats for receiving said lugs to detachably connect said sections, said inner section adjacent said seats being transversely slotted to permit flexing thereof to facilitate assemblage and detachment of said sections.

JOHN N. McQUEEN.